March 31, 1959   G. K. NEWELL   2,879,866
BRAKE SHOE ASSEMBLAGE
Filed Oct. 28, 1954   3 Sheets-Sheet 1
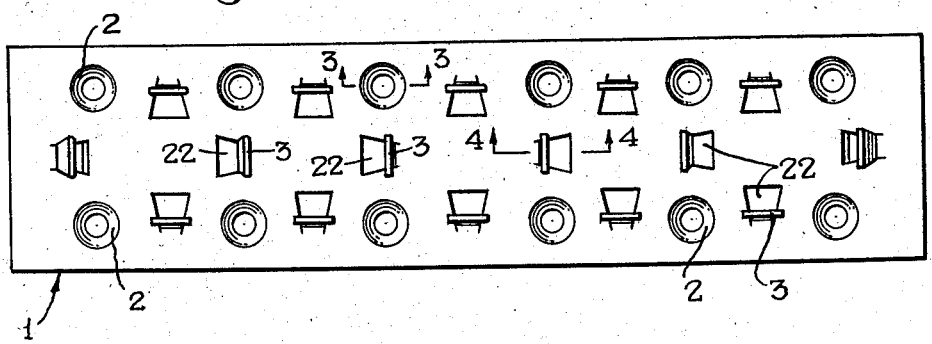
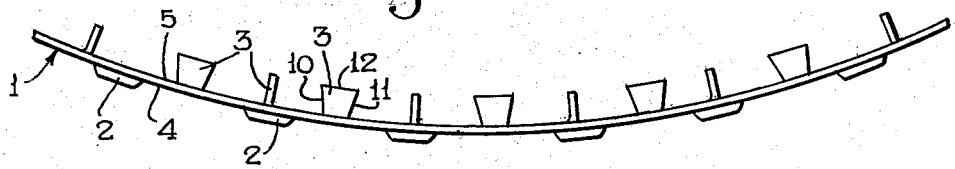
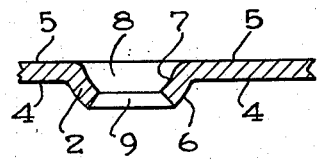
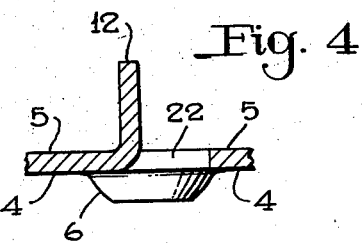
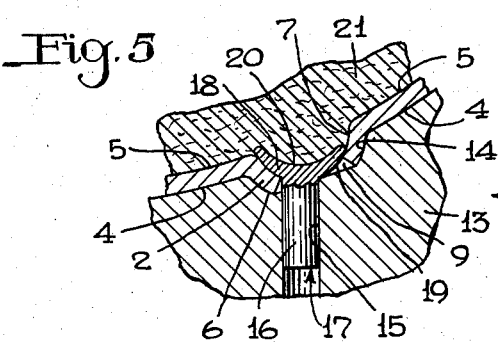
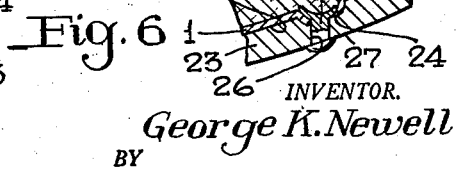
INVENTOR.
George K. Newell
BY
Adelbert A. Steinmiller
ATTORNEY March 31, 1959     G. K. NEWELL     2,879,866
BRAKE SHOE ASSEMBLAGE
Filed Oct. 28, 1954     3 Sheets-Sheet 2
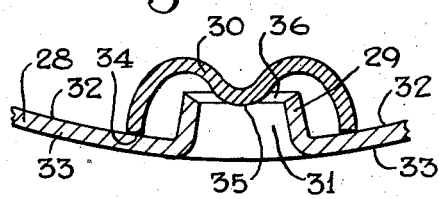
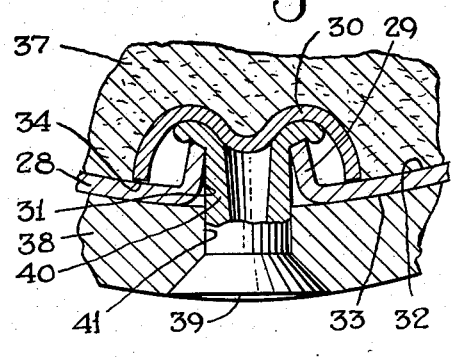
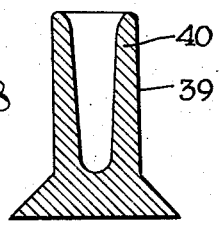
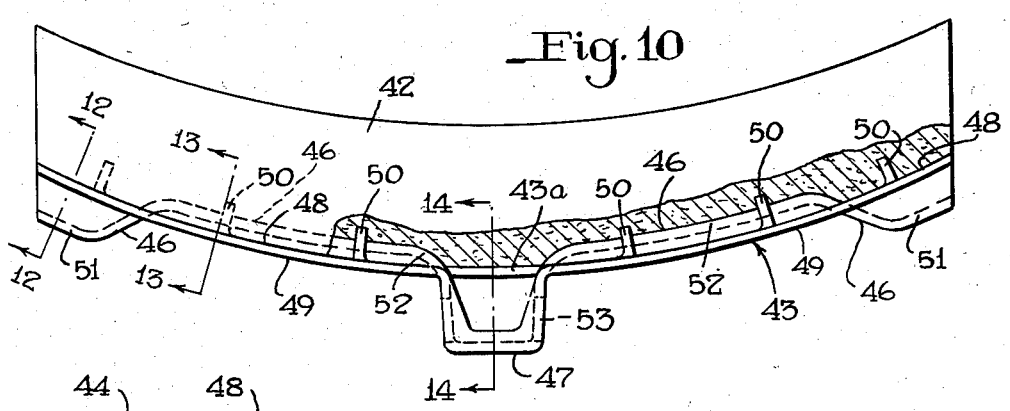
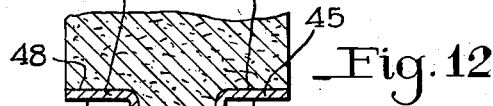
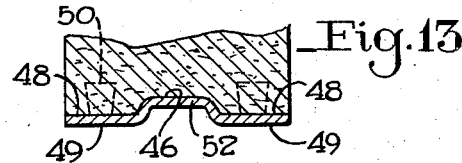
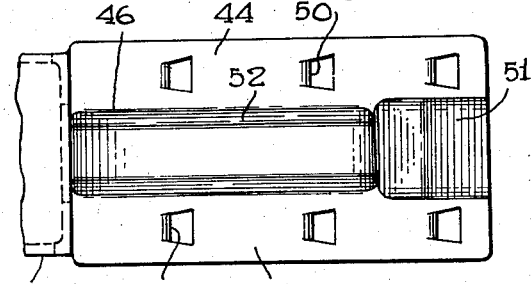
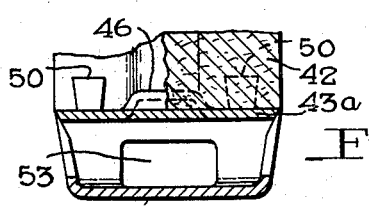
INVENTOR.
George K. Newell
BY
Adelbert A. Steinmiller
ATTORNEY March 31, 1959  G. K. NEWELL  2,879,866
BRAKE SHOE ASSEMBLAGE
Filed Oct. 28, 1954  3 Sheets-Sheet 3

INVENTOR.
George K. Newell
BY
ATTORNEY

United States Patent Office 2,879,866
Patented Mar. 31, 1959

2,879,866

BRAKE SHOE ASSEMBLAGE

George K. Newell, Pitcairn, Pa., assignor to Westinghouse Air Brake Company, Wilmerding, Pa., a corporation of Pennsylvania Application October 28, 1954, Serial No. 465,378

7 Claims. (Cl. 188—234)

This invention relates to brake shoe assemblages and more particularly to those of the molded type in which a composition brake shoe is molded onto shoe supporting means whereby the assemblage is secured to a brake head.

In the railway brake art, molded composition brake shoes have recently been developed which provide long brake shoe life and yet cause a minimum of wear of a railway car wheel. Because a brake shoe of molded composition brake material is relatively weak against bending and shearing forces, however, difficulty has been encountered in supporting a brake shoe of this type in such a way that it may withstand, without fracture, the forces to which it will be subjected in service.

It has heretofore been proposed to use a relatively heavy, reuseable backing plate to which the molded composition brake shoe is secured by conventional methods, such as rivets passing through drilled holes and then peened over, glue, screws, etc.; but these methods have proved unsatisfactory for commercial use because of relatively poor strength or relatively high labor costs.

The principal object of the invention is therefore to provide a prefabricated molded assemblage comprising a composition brake shoe and means for supporting said brake shoe.

Another object is to provide a brake shoe molded assemblage which is relatively inexpensive to manufacture and install.

Another object is to provide molded assemblages comprising a molded composition brake shoe and novel means for imparting added strength to said brake shoe and also facilitating connection thereof to the brake rigging of a vehicle.

According to the foregoing objects, four embodiments of a composition brake shoe molded assemblage are shown and hereinafter described. In the first embodiment, the molded assemblage comprises a composition brake shoe that is molded to an expendable rivet plate from which project a plurality of rivets that are molded in place and adapted to secure the assemblage to a reuseable backing plate. In the second embodiment, the molded assemblage comprises a composition brake shoe molded to an expendable rivet plate provided with means for flaring out hollow-end rivets that pass through a reuseable backing plate for securing the molded assemblage to the backing plate. In the third embodiment, the molded assemblage comprises a composition brake shoe that is molded to an expendable backing plate that has a central longitudinally extending rib portion for centering the brake shoe relative to the backing plate and supporting the brake shoe where it is unsupported by the usual transversely recessed brake head. In the fourth embodiment, the molded assemblage comprises a composition brake shoe having embedded therein a reticulated element carrying exposed, spaced discs that are adapted to be drilled and tapped for accommodating screws whereby the assemblage is adapted to be secured directly to a reuseable backing plate.

Other objects and advantages will become apparent from the following more detailed description of the invention and from the accompanying drawings, wherein:

Fig. 1 is an elevational view of an expendable or disposable rivet plate used in one embodiment of the invention;

Fig. 2 is a plan view of the rivet plate shown in Fig. 1;

Fig. 3 is an enlarged sectional view taken along the line 3—3 of Fig. 2;

Fig. 4 is an enlarged sectional view taken along the line 4—4 of Fig. 2;

Fig. 5 is an enlarged fragmentary sectional view of a portion of the rivet plate of Fig. 1 shown in association with a rivet and a molded composition brake shoe before removal from a mold;

Fig. 6 is an enlarged fragmentary sectional view of a portion of a molded assemblage comprising the rivet plate of Fig. 1, one of a plurality of rivets and a molded composition brake shoe, shown secured to a reuseable backing plate;

Fig. 7 is an enlarged sectional view of a modified portion of the disposable rivet plate shown in Fig. 1, such modified portion being in lieu of the structure shown in Fig. 3 and illustrating another embodiment of the invention;

Fig. 8 is an enlarged sectional view of a standard, hollow-end rivet adapted for use with a rivet plate of the type shown in Fig. 7;

Fig. 9 is an enlarged, fragmentary sectional view of a portion of a backing plate shown secured through the medium of the rivet of Fig. 8 to the modified rivet plate of Fig. 7;

Fig. 10 is an elevational view, partly broken away, of a molded assemblage comprising a composition brake shoe and an expendable backing plate constituting a third embodiment of the invention;

Fig. 11 is a fragmentary view of the underside of the backing plate shown in Fig. 10;

Fig. 12 is a sectional view taken along the line 12—12 of Fig. 10;

Fig. 13 is a sectional view taken along the line 13—13 of Fig. 10;

Fig. 14 is a sectional view taken along the line 14—14 of Fig. 10;

*Description—Figs. 1 through 6*

Figure 16:
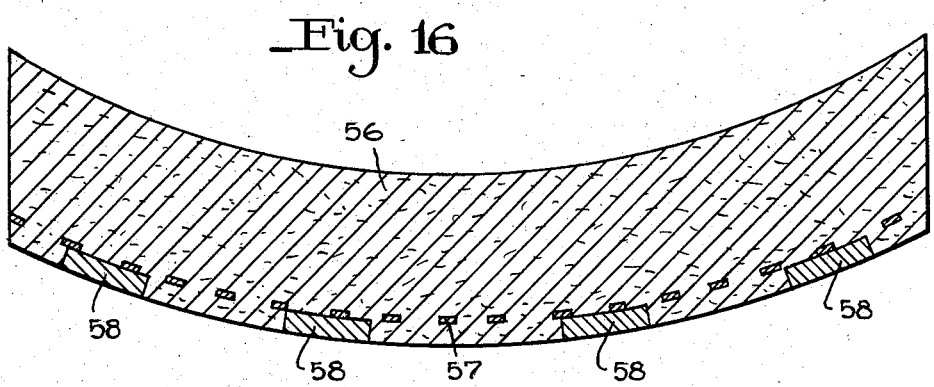
Fig. 16 is a sectional view taken along the line 16—16 of Fig. 15.

Referring to Figs. 1 and 2 of the drawings, the reference numeral 1 designates an expendable or disposable rivet plate which is preferably fabricated from sheet metal by a stamping operation so as to provide a plurality of protuberances 2 and anchor tabs 3 that are formed integrally with the rivet plate and extend in generally opposite directions from a convex surface 4 and an oppositely arranged concave surface 5 of said rivet plate, respectively.

Referring also to Fig. 3 of the drawings, each protuberance 2 has the appearance of an annular lip that is defined by a convex spherical surface 6, which is joined to and extends outwardly from the surrounding convex surface 4 of the rivet plate 1, and is further defined by a concave spherical surface 7 which joins the surrounding concave surface 5 of said plate and is, in turn, defined by a depression or cavity 8 formed in said concave surface 5. Each protuberance 2 also has a preferably tapered opening 9 that is coaxially aligned with the cavity 8 and extends from the surface 6 to the surface 7; said opening being of greatest diameter adjacent the surface 6, for reasons hereinafter to be explained.

Referring now to Figs. 1, 2 and 4 of the drawings, each anchor tab 3 is preferably formed, during stamping of the rivet plate 1, by successively cutting a U-like slit in said plate and then bending the metal bounded by said slit, using the open end of the U as a pivot, such that when so formed, each anchor tab 3 has the appearance of a quadrilateral wedge which projects at substantially right angles from the concave surface 5 and is defined by oppositely arranged edges 10, 11 which are joined at their projecting ends by an edge 12 and at their respective opposite ends are joined to a "base" formed by the surface 5. The edges 10, 11 are preferably so inclined to the surface 5 as to define between them an acute included angle such that the edge 12 is of greater length than that of the "base" of the corresponding anchor tab.

The respective protuberances 2 may, for sake of illustration, be arranged in parallel rows and uniformly spaced on the rivet plate 1; whereas the anchor tabs 3 are preferably arranged in a separate row between said parallel rows, as well as between the protuberances 2 in each of said parallel rows. It is to be noted that the anchor tabs 3 are variously positioned such that the edges 12 of some of said tabs extend transversely of the rivet plate 1 and the edges 12 of the remaining tabs extend longitudinally of said rivet plate, for reasons hereinafter to be explained.

As shown in Fig. 5 of the drawings, a pre-formed rivet plate 1 of the type just described is placed against the base of a mold 13, which has a plurality of recesses defined by concave spherical surfaces 14 for engaging the convex spherical surfaces 6 of the respective protuberances 2 of said rivet plate and thereby "backing up" said protuberances to prevent distortion of the same during the molding operation. The base of mold 13 has a plurality of bores 15, each of which extends inwardly from a corresponding surface 14 for accommodating a shank 16 of a rivet 17. Each rivet 17 comprises a head 18 having a convex spherical surface 19 adjoining the shank 16 and adapted to make surface, as distinguished from linear, contact with the concave spherical surface 7 of the corresponding protuberances 2 irrespective of the degree of angularity of the axis of the rivet relative to the axis of the protuberance, as hereinafter to be explained. A surface 20, preferably concave (although it may be flat, if desired), defines the end of head 18 opposite the shank.

With the respective rivets 17 thus inserted into the rivet plate 1 and projecting into the corresponding bores 15 of the mold 13 and supported by engagement of the heads 18 with the concave spherical surfaces 7 of the corresponding protuberances 2, composition brake material is admitted to the upper part (not shown) of the mold so as to cover the concave surface 5 and anchor tabs 3 of said rivet plate; and then heat and pressure are applied in the usual manner for forming a molded assemblage comprising a composition element or brake shoe 21, the rivet plate 1, and the various rivets 17.

It should be noted that the axes of the respective bores 15 of the mold 13 are all parallel to the radial center line of the rivet plate 1, so that the rivet plate 1 may be removed from said mold and withdraw the respective rivets 17, which are now molded to the brake shoe 21 and rivet plate 1 and project exteriorly of the corresponding protuberances 2. It will also be noted that irrespective of the angularity of the axes of the rivets 17 relative to the axes of the corresponding protuberances 2 (which angularity will be greatest at the extremities of the rivet plate and result from the requisite parallel relationship of the bores 15, as just described), the respective mating spherical surfaces 19, 7 will assure full surface contact between said rivets and protuberances for thereby assuring that despite the high pressure exerted during the molding operation, composition brake material will not flow through the opening 9; and hence such material cannot solidify against the surface 14 or be extruded into the bore 15 and thus prevent removal of the rivet plate from the mold.

The opening 9 is preferably tapered outwardly from surface 7 to surface 6 so as to provide a maximum degree of surface contact between the head 18 and protuberances 2, while at the same time allowing for maximum variation in angular position of the axis of the rivet 17 relative to the axis of the protuberance 2.

It will also be noted that during the molding operation, composition brake material will flow around and be bonded to the anchor tabs 3 and also fill the spaces 22 (Fig. 4) formed during stamping of the rivet plate 1. Composition brake material filling these spaces 22 will not, however, interfere with removal of the molded assemblage from the mold 13, because the surface of the mold adjacent said spaces follows the contour of the convex surface 4 of the rivet plate 1. Moreover, the anchor tabs 3 are arranged both transversely and longitudinally of the rivet plate 1 so as to strengthen the molded brake shoe 21 against longitudinal and transverse shearing forces, respectively; and the anchor tabs are wedge-shaped, and of greater length along the edge 12 than the aforementioned "base" so as to provide a tab of maximum effective "locking" width interiorly of the brake shoe 21 for an opening 22 of a chosen area.

As partially shown in Fig. 6 of the drawings, the molded assemblage is now mounted on a reuseable metallic, generally concave-convex backing plate 23 having a plurality of separated or spaced concave spherical surfaces 24 defined by depressions in a concave surface 25 of said backing plate and so arranged as to be engaged by the convex spherical surfaces 6 of the corresponding protuberances 2 of the rivet plate 1; said concave surface 25 of the backing plate making surface contact with the convex surface 4 of the rivet plate 1. The backing plate 23 also has a plurality of parallel bores 26 extending from the respective surfaces 24 through the convex surface 27 of the backing plate for accommodating, in substantially sliding engagement, the shanks 16 of the respective rivets 17, which shanks project exteriorly of said convex surface 27 and are adapted to be peened over to positively secure the molded assemblage to the backing plate.

With the molded assemblage thus secured to the backing plate 23, it is to be noted that any force acting in such manner as to tend to shear the rivets 17 will actually be transmitted from the brake shoe 21 to the backing plate 23 through the engagement of the convex spherical surfaces 6 of the protuberances 2 with the concave surfaces 24 of the backing plate 23, for thereby permitting the molded composition brake shoe to withstand shearing forces which might otherwise fracture said brake shoe.

When the brake shoe 21 becomes worn to such a degree as to require replacement, the rivet plate 1 is separated from the reuseable backing plate 1 by shearing the rivets 17 and said rivet plate is thrown away. The operator then secures a new, prefabricated molded assemblage to the reuseable backing plate 23 by peening over the projecting ends of the rivets in the manner already described.

It will thus be seen that with the novel molded assemblage comprising the disposable rivet plate 1, the molded composition brake shoe 21 and a plurality of rivets 17 molded therewith, the brake shoe is not only reinforced against shearing forces but it may also be more readily and rapidly secured to the reuseable backing plate by maintenance crews in railway shops.

Description—Figs. 7 through 9

According to this embodiment of the invention, a rivet plate 28 is identical in structure with that shown in Figs. 1 through 6 of the drawings except that a protuberance or annular rib 29 capped by a hollow, generally semi-spherical button 30 is provided in lieu of each protuberance 2 of the first embodiment; said rivet plate 28 being provided with wedge-shaped anchor tabs (not shown) which may be identical with the anchor tabs 3 of the first embodiment, already described.

Each annular rib 29 is so formed, during stamping of the rivet plate 28, as to assume the appearance of a punched hole with an upturned rim that encircles a through opening 31 and is joined to a surrounding concave surface 32 and a convex surface 33 of said rivet plate; said ribs projecting from said concave surface, and thus extending in the same direction as the aforementioned anchor tabs, and the axes of said ribs are preferably arranged in radial relation to the rivet plate.

Each button 30 has the appearance of an inverted bowl, the rim-like annular edge 34 of which is secured, as by resistance welding, to the concave surface 32 in surrounding, concentric, spaced relation to the rib 29. Each button 30 has a convex spherical surface 34 which is formed counter to the main, or concave, spherical surface that is adjacent the rim-like edge 34. The surface 35 is formed coaxially with, and projects toward and partially into, the opening 31, so as to provide a generally annular space 36 between the surface 35 and surrounding rib 29.

The rivet plate 28, as thus provided with the annular rib 29, button 30 and aforementioned anchor tabs, is placed in a mold (not shown) and composition brake material is then supplied and subjected to heat and pressure in the manner heretofore described, for molding a composition brake shoe 37 to the disposable rivet plate 28. During the molding operation, no composition brake material can get under the button 30 because of the welded joint between the edge 34 of said button and the rivet plate 28, and the button 30 is, of course, of such thickness as to resist collapse during the molding operation.

A prefabricated molded assemblage, comprising the brake shoe 37 and rivet plate 28, is mounted on, and secured to, a reuseable backing plate 38 through the medium of rivets 39 having generally tubular shanks 40. The backing plate 38 has a plurality of through openings 41 adapted for coaxial alignment with the corresponding openings 31 of the rivet plate 28; and as each rivet 39 is driven into the corresponding openings 41, 31, the projecting tubular end of the shank 40 will successively engage the spherical surface 35 of the button 30 and then be flared or spread outwardly through the space 36 between the spherical surface 35 of the button 30 and the projecting end of the rib 29, thus positively and rigidly connecting the molded assemblage to the backing plate 28.

When the brake shoe requires replacement, the molded assemblage is removed from the backing plate 38 and thrown away. A new molded assemblage is then mounted to the reuseable backing plate 38, in the manner above described.

Description—Figs. 10 through 14

According to this embodiment, the molded assemblage comprises a composition brake shoe 42 that is molded to a prefabricated, preferably stamped, expendable backing plate 43.

The backing plate 43 comprises two curved portions 44, 45 of identical configuration that are separated by a central rib portion 46 that extends longitudinally from one arcuate end of the backing plate to the opposite end, and also comprises a U-shaped lug or eyelet 47 that extends transversely of said backing plate equidistant from said arcuate ends; all of said portions and the lug 47 preferably being formed integrally with the backing plate. The lug 47 is isolated from the brake shoe 42 by a bridge piece 43a which is welded to the plate 43 after stamping thereof but before molding of the shoe 42 thereto in order to prevent molded material from flowing into the lug.

The curved portions 44, 45 are each defined by a longitudinally extending concave surface 48 and, at the opposite side therefrom, a convex surface 49; the concave surfaces 48 and also the convex surfaces 49 of the respective portions 44, 45 being of identical contour. Wedge-shaped anchor tabs 50, preferably formed integrally with and extending transversely of the backing plate 43, project at substantially right angles from the concave surfaces 48 of the respective portions 44, 45 and are uniformly spaced in single, longitudinal rows along said portions; said anchor tabs being provided for securing the brake shoe 42 against longitudinal sliding movement relative to said backing plate.

The central rib portion 46 comprises two generally U-shaped parts 51, each of which extends a certain longitudinal distance from a corresponding arcuate end of the backing plate 43 toward the lug 47 and is so disposed that the sides and base of the U are below the level of the curved portions 44, 45, as viewed in Fig. 10 of the drawings. The parts 51 of the rib portion 46 are formed integrally with adjoining, generally inverted U-shaped parts 52 that extend longitudinally toward and join opposite sides of the U-shaped lug 47; said parts 52 being so arranged that the sides and base of the U are above the level of the curved portions 44, 45, as viewed in Fig. 10 of the drawings. As shown in Fig. 12 of the drawings, the parts 51 of the rib portion 46 serve to position or center the brake shoe 42 relative to the backing plate 43. As shown in Fig. 13 of the drawings, the parts 52 serve as stiffening or support ribs for supporting the composition brake shoe 42 over the arc or area normally unsupported by the usual transversely recessed brake head (not shown) to which the backing plate 43 is adapted to be connected, in the usual manner, through the medium of a key (not shown) that, in turn, is adapted to pass through and engage the wall of a longitudinal opening 53 provided in the lug 47.

Thus, with a molded assemblage of the type just described, the anchor tabs 50 resist any shear forces acting in a longitudinal direction, and any shear forces acting in a transverse direction are transmitted to said brake head through the parts 51, 52 of the rib portion 46 of the backing plate 43. When the brake shoe 42 becomes worn to a degree where replacement is required, the entire molded assemblage is thrown away and a new molded assemblage, comprising a brake shoe 42 and backing plate 43, is installed; such structure thus reducing to an absolute minimum, the labor costs involved in replacing brake shoes.

Figure 15:
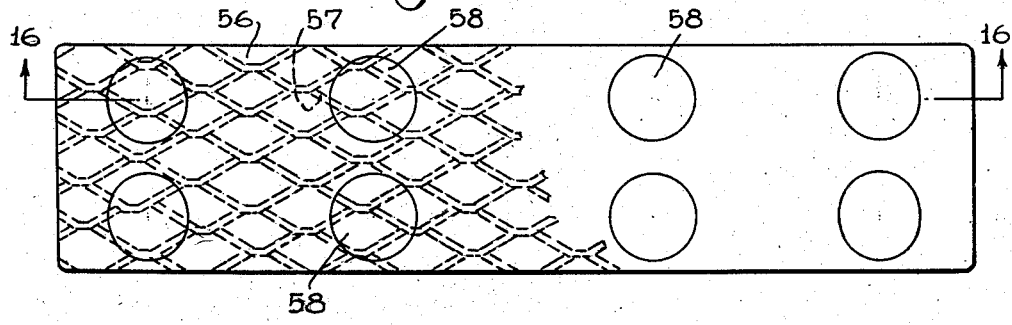
Fig. 15 is a view partly in phantom and partly in outline, of the underside of a molded assemblage constituting a fourth embodiment of the invention and comprising a composition brake shoe and means for facilitating its connection to a backing plate.
Figure 17:
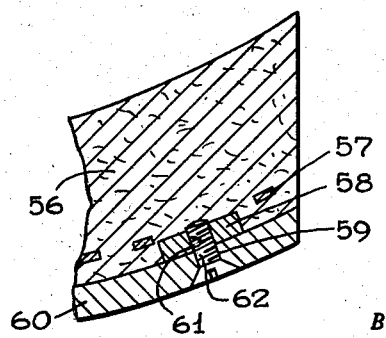
Fig. 17 is a fragmentary sectional view of the molded assemblage of Fig. 16 shown secured to a reuseable backing plate.

Description—Figs 15 through 17

According to this embodiment, the molded assemblage comprises a generally concave-convex composition brake shoe 56 and, near the convex surface of said shoe, a layer of a reticulated element, such as a metallic mesh 57, to which has previously been secured, as by tack welding, a plurality of metallic discs 58, preferably about one inch in diameter and about 3/16" thick and so positioned as to be substantially concentric with the locations of fastening holes 59 in a reuseable backing plate 60 (Fig. 17).

With the mesh 57 molded in the brake shoe 56, as shown in Figs. 15, 16 of the drawings, a suitable jig or fixture may be used to lay out the locations of the fastening holes 59 of the backing plate 60 on the metallic discs 58, so that holes 61 may be drilled through said discs and thereafter tapped for accommodating conventional screws 62 whereby the brake shoe may be secured to the backing plate; or, if preferred, after drilling of the holes 61 in the discs 58, standard self-tapping drive screws may be used for securing the brake shoe 56 to the backing plate 60.

It will be noted that the relatively large size of the discs 58 will insure that the drill will enter the discs despite any slight shifting of the mesh 57 in the mold.

*Summary*

It will now be seen that molded assemblages of various types have been provided for facilitating support and connection of a composition brake shoe to the brake rigging. According to the first embodiment of the invention, the molded assemblage comprises a composition brake shoe 21 molded to a disposable rivet plate 1 from which projects a plurality of rivets 17 whereby said assemblage is adapted to be secured to a reuseable backing plate 23. According to the second embodiment, the molded assemblage comprises a composition brake shoe 37 molded to a disposable rivet plate 28 having a plurality of annular ribs 29 each capped by a button 30 welded to the rivet plate and shrouding the corresponding rib from the composition brake material of the brake shoe; said ribs and buttons cooperating to define an annular space 36 into which hollow-end rivets 39, after passing through a reuseable backing plate 38, are adapted to be driven for upsetting said ends of the rivets so as to secure the molded assemblage to the backing plate 38. According to the third embodiment, the molded assemblage comprises a composition brake shoe 42 molded to an expendable backing plate 43 having a central, longitudinally extending rib portion 46, parts 51 of which serve to center the shoe relative to the backing plate, and parts 52 of which serve to support the brake shoe where it is unsupported by the conventional brake head. According to the fourth embodiment, the molded assemblage comprises a composition brake shoe 56 having molded therein adjacent a convex surface of said shoe a metallic mesh 57 to which had been welded, prior to the molding operation, a plurality of metallic discs 58 that are adapted to be drilled and tapped for accommodating screws 62 whereby the brake shoe 56 is adapted to be secured directly to a reuseable backing plate.

In the first three embodiments, anchor tabs are provided for securing the molded composition brake shoe against shifting.

Thus in its various embodiments the improved molded assemblages not only impart increased strength to the molded composition brake shoe but also greatly facilitate initial installation and replacement of a shoe of this type.

Having now described the invention, what I claim as new and desire to secure by Letters Patent, is:

1. A molded assemblage comprising a rivet plate having a generally concave surface provided with a plurality of spaced-apart recesses defined by concave spherical surfaces, said rivet plate having opposite said concave surface a generally convex surface, a plurality of rivets each having a convex spherical surface that makes surface contact with a corresponding one of said concave spherical surfaces and each having a shank that projects in a direction parallel to the radial center line of said convex surface of said rivet plate and with side clearance through a corresponding opening in said rivet plate and exteriorly of the convex surface thereof, and a composition brake shoe having an imperforate curved braking face, said brake shoe being molded to the concave surface of said rivet plate and holding said rivets in place relative to said rivet plate, said rivets completely isolating the brake shoe from the respective openings to prevent extrusion of the composition material of the brake shoe into said openings during molding of the brake shoe to the rivet plate.

2. The combination according to claim 1, wherein said rivet plate comprises a plurality of protuberances each surrounding a corresponding one of said openings, each of said protuberances having a convex spherical surface joining the convex surface of said rivet plate and adapted for engagement with a surface of converse configuration in a backing member to which said assemblage may be secured by said rivets.

3. The combination according to claim 1, including a plurality of anchor tabs projecting from the concave surface of said rivet plate into said brake shoe for securing said brake shoe against shifting relative to said rivet plate, some of said anchor tabs extending transversely of the rivet plate and some of said anchor tabs extending longitudinally of said rivet plate.

4. A molded assemblage comprising a composition brake shoe having an imperforate curved braking face, a generally concave-convex rivet plate having a concave surface to which said brake shoe is molded and also having a convex surface, a plurality of spaced protuberances formed integrally with said rivet plate and extending outwardly from said convex surface, and a plurality of rivets each having a head with a convex spherical surface that joins a shank, each of said protuberances having a convex spherical outer surface adapted for engagement with a corresponding surface of converse configuration in a backing member, and also having a concave spherical inner surface engaged by the convex spherical surface of a corresponding one of said rivets, and further having a central opening connecting said inner and outer surfaces and through which the shank of the corresponding rivet projects exteriorly of such protuberance, the axes of the respective rivets being substantially parallel to each other, and the convex and concave spherical surfaces of the respective rivets and protuberances assuring surface contact between said rivets and protuberances despite the substantially parallel relationship of the axes of said rivets.

5. A molded assemblage comprising a rivet plate having a generally concave surface provided with a plurality of spaced-apart recesses defined by concave spherical surfaces, said rivet plate having opposite said concave surface a generally convex surface, a plurality of rivets each having a convex spherical surface that makes surface contact with a corresponding one of said concave spherical surfaces and each having a shank that projects through a corresponding opening in said rivet plate and exteriorly of the convex surface thereof, and a composition brake shoe molded to the concave surface of said rivet plate and holding said rivets in place relative to said rivet plate, and a plurality of wedge-shaped anchor tabs projecting from the concave surface of said rivet plate and embedded in said brake shoe for locking said brake shoe against sliding movement relative to said rivet plate, some of said anchor tabs extending transversely of said rivet plate and some of said tabs extending longitudinally of said rivet plate.

6. A molded assemblage comprising a rivet plate having a generally concentrically arranged concave surface and convex surface, and a brake shoe comprising composition material and molded to one of said surfaces of the rivet plate and having at its side opposite said rivet plate an imperforate braking surface, said rivet plate having formed in one of its said surfaces a plurality of spaced-apart concave spherical recessed surfaces, a plurality of rivets each having a convex spherical surface that makes surface contact with a corresponding one of said concave spherical surfaces and each having a shank that projects in a direction parallel to the radial center line of said rivet plate and with side clearance through a corresponding opening in said rivet plate and exteriorly thereof, said rivets completely isolating the composition material of the brake shoe from the respective openings to prevent extrusion of such composition material into said openings during molding of the assemblage and being secured in place relative to the brake shoe and rivet plate in consequence of such molding for providing a means whereby said assemblage after molding may be connected to another member through the medium of the portions of the respective rivet shanks projecting exteriorly of said rivet plate, said rivet plate also having a plurality of integrally formed wedge-shaped anchor tabs projecting in different directions into the composition material of said brake shoe for locking said brake shoe against both arcuate and transverse shifting relative to said rivet plate.

7. A molded assemblage comprising a rivet plate having a generally concave surface provided with a plurality of spaced-apart recesses defined by concave spherical surfaces and another surface opposite said generally concave surface, said rivet plate also having a plurality of through openings each extending from one of said recesses through said other surface, a plurality of rivets each having a convex spherical surface that makes surface contact with a corresponding one of said concave spherical surfaces, said rivets having shanks the respective axes of which are disposed in parallel relation to each other and project through and exteriorly of respective ones of said openings, and a composition element formed of composition material molded to the concave surface of said rivet plate and holding said rivets in place such that their respective shanks are parallel as aforesaid, and a plurality of wedge-shaped anchor tabs projecting from the concave surface of said rivet plate in different directions into the composition material of said element and embedded in said element for locking said element against both transverse and arcuate shifting relative to said rivet plate.

References Cited in the file of this patent

UNITED STATES PATENTS

| | | |
|---|---|---|
| 882,107 | Goodwin | Mar. 17, 1908 |
| 1,225,555 | Achtmeyer | May 8, 1917 |
| 1,677,372 | Ruhling | July 17, 1928 |
| 1,796,433 | Blume | Mar. 17, 1931 |
| 1,875,645 | Norton | Sept. 6, 1932 |
| 1,912,684 | Blume | June 6, 1933 |
| 1,917,820 | Brackett | July 11, 1933 |
| 1,986,144 | Glick | Jan. 1, 1935 |

FOREIGN PATENTS

| | | |
|---|---|---|
| 646,498 | France | July 16, 1928 |
| 707,273 | France | July 6, 1931 |